US 6,508,182 B1

(12) United States Patent
Smorgan et al.

(10) Patent No.: US 6,508,182 B1
(45) Date of Patent: Jan. 21, 2003

(54) PLASTICS PALLETS AND MOULDING APPARATUS FOR PRODUCING PLASTICS PALLETS AND OTHER PLASTIC ARTICLES

(75) Inventors: Victor Smorgan, Laverton North (AU); Lazer Berelovich, Elsternwick (AU)

(73) Assignee: Vicfam Plastics Pty Ltd., Victoria (AU)

( * ) Notice: Subject to any disclaimer, the term of this patent is extended or adjusted under 35 U.S.C. 154(b) by 0 days.

(21) Appl. No.: 09/486,148

(22) PCT Filed: Aug. 25, 1998

(86) PCT No.: PCT/AU98/00683

§ 371 (c)(1),
(2), (4) Date: May 11, 2000

(87) PCT Pub. No.: WO99/10243

PCT Pub. Date: Mar. 4, 1999

(30) Foreign Application Priority Data

Aug. 26, 1997 (AU) .............................. PO 8779
Oct. 27, 1997 (AU) .............................. PP 0010

(51) Int. Cl.[7] .................................. B65D 19/38
(52) U.S. Cl. .................. 108/57.28; 108/57.25
(58) Field of Search .................. 108/57.28, 57.25, 108/56.1, 53.1, 51.3; 425/527

(56) References Cited

U.S. PATENT DOCUMENTS 3,732,051 A    5/1973  Sakabe et al.
3,795,206 A  * 3/1974  Utz ........................ 108/901 X
3,926,321 A  * 12/1975 Trebilcock ................ 108/53.1
4,013,021 A  * 3/1977  Steinlein et al. ......... 108/57.25
4,287,836 A  * 9/1981  Aoki ..................... 108/901 X
4,301,743 A  * 11/1981 Keller .................... 108/53.1
5,937,767 A  * 8/1999  Togawa et al. ........... 108/901 X
6,164,214 A  * 12/2000 Smorgon et al. .......... 108/901 X
6,173,659 B1 * 1/2001  Danks et al. ............ 108/901 X

FOREIGN PATENT DOCUMENTS

DE      2064131          7/1972
DE      2525868          9/1976
DE      4128883 A1       3/1993
DE      19510873 A1      9/1996
EP      0301445      *   2/1989 ............ 108/57.28
EP      0839732 A2       5/1998

* cited by examiner

Primary Examiner—Jose V. Chen
(74) Attorney, Agent, or Firm—Harness, Dickey & Pierce, P.L.C.

(57) ABSTRACT

A pallet of moulded construction comprising a load-carrying surface supported by underlying support structure configured to permit the insertion of the tines of the fork-lift, the load-carrying surface being reinforced at its underside by a cellular reinforcing structure comprising cells the axes of which extend perpendiculary to the load-carrying surface.

9 Claims, 5 Drawing Sheets

PLASTICS PALLETS AND MOULDING APPARATUS FOR PRODUCING PLASTICS PALLETS AND OTHER PLASTIC ARTICLES

The present invention relates to pallets and more particularly to pallets of moulded plastics construction, and to moulding apparatus for producing such pallets and other plastics articles.

The present applicants and their successors in business have devised a range of plastics pallets of one-piece moulded plastics construction formed by an injection moulding technique using either wholly or partially post-consumer recycled plastics. While these pallets are effective in use, the applicants have determined that it would be of advantage to construct a pallet of lighter weight whilst achieving similar strength characteristics to those of their earlier pallets.

More particularly there is disclosed in International Patent Application No. PCT/AU97/00382, the disclosure of which is hereby incorporated by reference, a load-carrying pallet moulded in one piece in a suitable plastics, for example post-consumer recycled plastics. International Patent Application PCT/AU95/00690 also discloses a load-carrying pallet formed as a one-piece plastics moulding. We are now proposing to produce a pallet of the type disclosed in the aforesaid applications but using less plastics material. This will be achieved by using thinner sections for the load carrying platform, the beams beneath the platform, and the ground-engaging struts at the underside of the pallet. However in order to achieve adequate rigidity of the overall structure we are proposing to reinforce the load-carrying platform by moulding a multiplicity of intersecting webs into the underside of the load carrying platform whereby the ribs intersect to define a cellular structure with the cells distributed throughout the exposed parts of the underside or at least in those parts subject to maximum loading. For example, the cellular structure may be of honeycomb form or alternatively the cells may be of rectangular or diamond shape. In each case, the axis of each individual cell will extend perpendicularly to the plane of the load carrying surface and each cell will be open at its underside.

According to one aspect of the present invention, there is provided a pallet of moulded construction comprising a load-carrying surface supported by underlying support structure configured to permit the insertion of the tines of the fork-lift, the load-carrying surface being reinforced at its underside by a cellular reinforcing structure comprising g cells the axes of which extend perpendicularly to the load-carrying surface.

Advantageously, the underlying support structure comprises a series of parallel beams of hollow construction comprising opposed side walls, the beams being internally reinforced by webs defining a cellular structure extending to the underside of the load-carrying platform, and the axes of the cells of the reinforcing structure within the beams being substantially perpendicular to the load-carrying platform.

Advantageously, the beams have transverse apertures to permit insertion of the tines of a fork-lift laterally to the beams, and the cellular reinforcement of the load-carrying platform in the zone of the platform adjacent the lateral apertures in the beams has a smaller cell size than that in other zones of the load-carrying platform.

Advantageously, the entire pallet is constructed in a single moulding operation and the mould incorporates a retractable core for forming the cellular reinforcement at the underside of the platform in the zones thereof adjacent the lateral apertures in the beams.

Advantageously, the cellular reinforcing structure in the beams extends to the underside of the beams, and the load-carrying platform is configured to define a pattern of upstanding projections and lands around the projections whereby when two like pallets are arranged in stacked relationship, the lower edges of the reinforcing cells of the beams of the upper pallet will engage with the lands on in the load-carrying platform of the lower pallet whereby to prevent slippage between the two pallets.

According to another aspect of the present invention there is provided an injection mould having a retractable mould core structure, said mould core structure comprising a retractable core configured to form cellular or other reinforcing structure at an inner surface of an article being moulded, and means for retracting said core in a direction substantially at right angles to said surface, said retracting means comprising at least one driving member mounted for reciprocatory movement in a direction at right angles to the direction of retraction, and means linking said driving member and core to translate said movement of the driving member into the required. movement of the core.

In a preferred embodiment of the invention the linkage provided between the core and the driving member is provided by one or more cooperating cams and cam tracks.

Advantageously, the driving member comprises a strip having a series of driving cams, said strip cooperating with a corresponding strip carried by the core and providing a series of cam tracks which cooperate with the respective cams such that movement of the driving strip in one direction causes retraction of the core and movement in the opposite direction causes extension of the core into an operative position for moulding. Preferably there are two or more such driving strips arranged in parallel relation and each cooperating with a respective strip carried by the core.

Preferably, the or each driving strip is driven by a fluid cylinder.

Advantageously, the cams and cam tracks cooperate when the core is in its operative moulding position to lock the core in that position against the pressure of the material being moulded.

The present invention also provides a method of injection moulding plastics articles using a retractable core structure as defined above.

The present invention also provides a moulded plastics article when produced by use of a mould incorporating a retractable core structure as defined above.

An embodiment of the invention will now be described, by way of example only, with reference to the accompanying drawings, in which.

Figure 1:
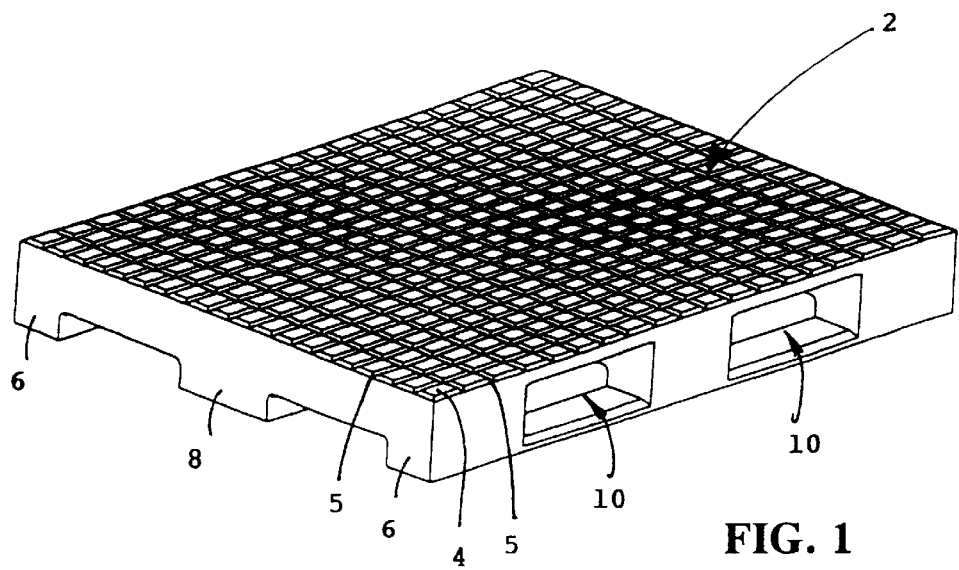
FIG. 1 is a perspective view of a pallet in accordance with a preferred embodiment of the invention.
Figure 2:
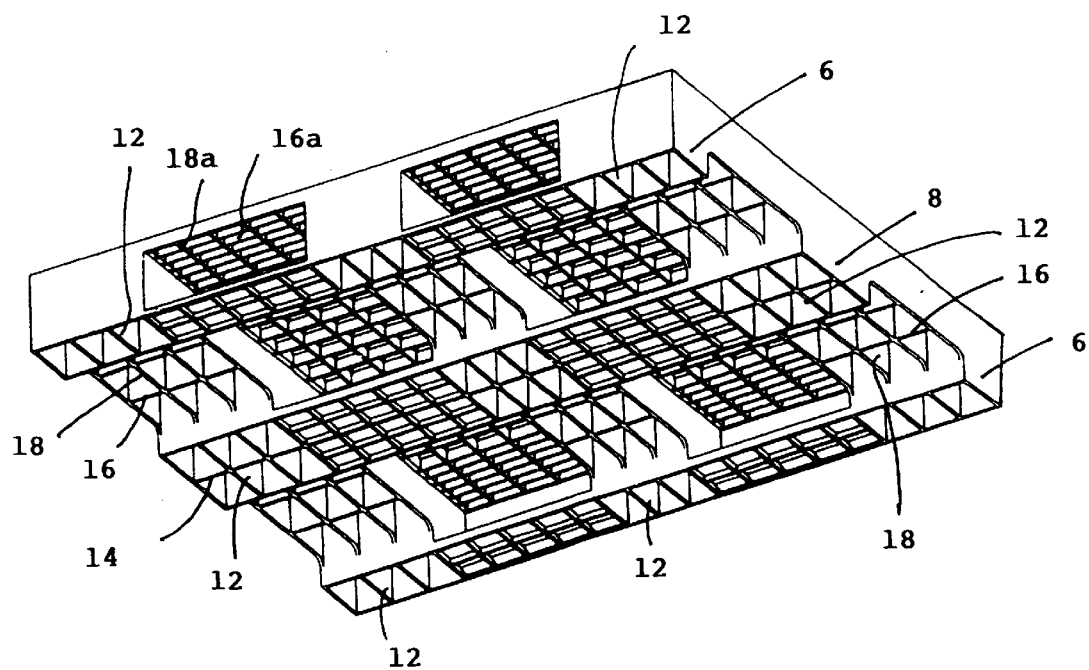
FIG. 2 is an underneath perspective view of the pallet.
Figure 3:
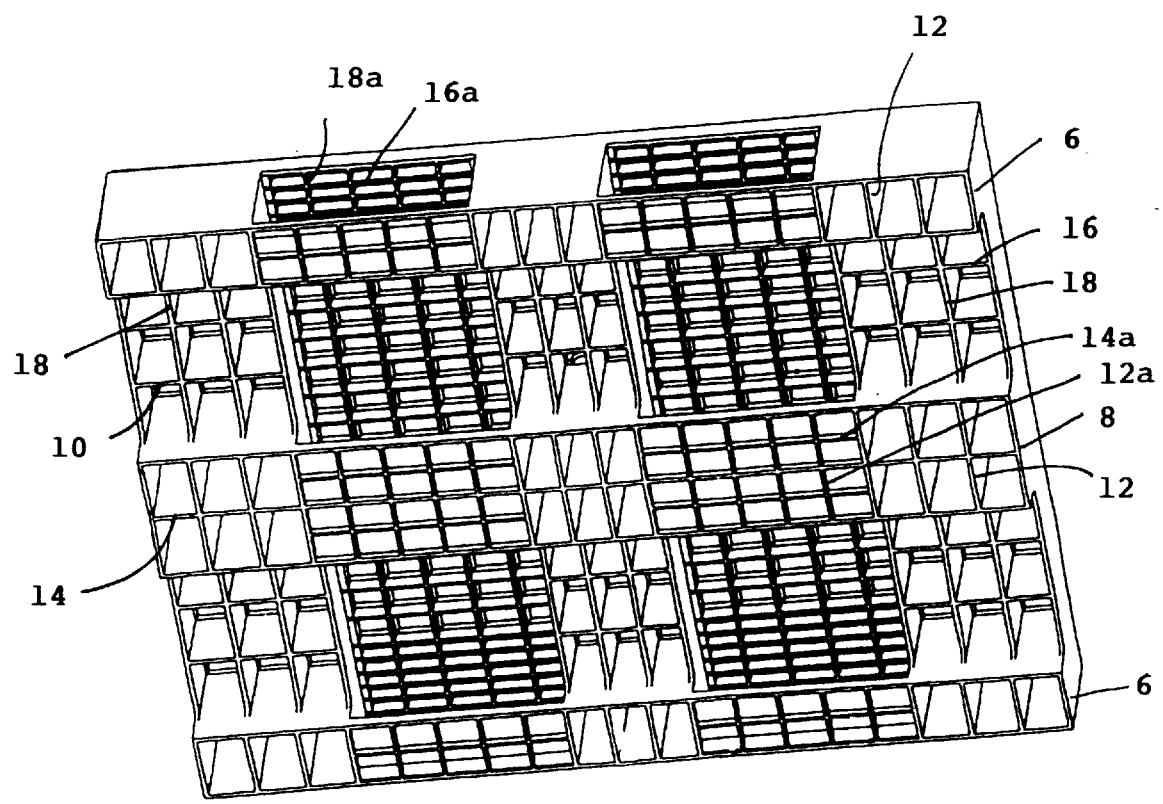
FIG. 3 is an underneath perspective view from a more oblique angle in order to better illustrate the underlying cellular reinforcing structure.

There is shown in the accompanying drawings a pallet of one-piece construction formed by injection moulding. The pallet may be formed wholly from post-consumer recycled plastics, a mixture of post-consumer recycled plastics and other plastics, or virgin plastics material. The pallet comprises a load-carrying platform 2 provided with multiplicity of upstanding projections 4 distributed over its entire surface, the projections 4 being separated by a grid-like pattern of longitudinal and transverse lands 5. As shown the projections 4 are of rectangular shape with a substantially planar upper surface. The projections act to prevent slippage of goods carried on the pallet while permitting the load-carrying surface easily to be cleaned, for example by hosing or steam cleaning. The projections 4 also provide a strengthening function for the platform 2 and a stacking function as will be described.

The load-carrying platform 2 is supported by an underlying support structure consisting of a series of parallel beams comprising two outer beams 6 defining opposed outer side walls of the pallet and a central beam 8. The beams 6,8 are spaced to define an access for the tines of a fork-lift truck from either of the two open ends of the pallet. The beams 6 defining the outer side walls of the pallet are also apertured at 10 to permit entry of the fork-lift tines from either of the two opposed sides thereby providing so-called four-way entry for the tines. The central beam 8 is also apertured in alignment with the apertures 10 in the outer beams 6 to permit passage of the fork-lift tines across the underside of the platform.

In order to provide a rigid structure of relatively light weight, each of the beams 6,8 is of hollow construction consisting of parallel side walls reinforced internally by webs 12 which extend from the base o f the beam 6 or 8 to the underside of the platform 2 at right angles thereto, except in those sections of the beams 6,8 provided with the apertures for entry of the fork-lift tines. In the case of the two outer beams 6, the webs 12 extend transversely between the longitudinal walls of the beams, whereas for the central beam 8 which is of greater width than the outer beams 6, there is also a central longitudinal reinforcing web 14. The web reinforcement not only reinforces the beams 6,8 but also reinforces the platform 2 whereby the platform 2 can also be of reduced thickness.

In addition to reinforcement by the beams 6,8 and the webs 12,14 within the beams 6,8, the load-carrying platform 2 is reinforced by a series of longitudinal and transverse webs 16,18 in the zones between the outer beams 6 and central beams, the webs 16,18 being perpendicular to the plane of the platform and extending respectively parallel to, and at right angles to, the axis of the beams 6,8. It will be noted that the web reinforcement of the platform 2 is, in the zones of the lateral apertures for the fork-lift tines in the outer and central beams, of reduced depth and in these zones in order to achieve effective reinforcement the longitudinal and transverse reinforcing webs 16a,18a are more closely spaced than elsewhere at the underside of the platform. For similar reasons, the parts of each of the outer and central beams 6,8 beneath the apertures for passage of the fork-lift tines have longitudinal and transverse reinforcing webs 14a, 12a of closer spacing than ill the remainder of the beams.

With a reinforcing structure as described above, the wall thickness of the pallet can be thinner than in the earlier pallets discussed at the outset, resulting in a substantial weight saving but without sacrificing strength and rigidity of the pallet.

Figure 4:
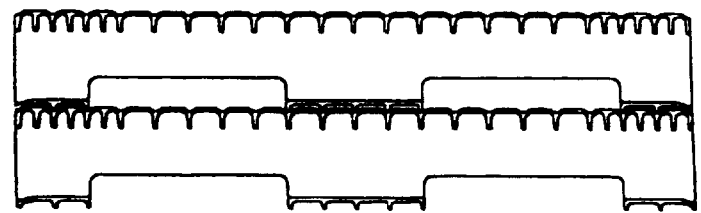
FIG. 4 is a schematic section through two such pallets arranged in stacked relationship in order to illustrate the relationship between the lower edges of the reinforcing cells of the upper pallet and the load-carrying platform of the lower pallet.

It will be noted that the reinforcing webs 12,14 which extend to the underside of the beams 6,8 define a structure consisting of open cells of rectangular form, the axes of which are at right angles to the platform 2. The boundary walls of these cells correspond to the rectangular pattern of lands 5 defined around the upstanding projections 4 (or groups of the projections 4) on the load-carrying platform 2 whereby when two such pallets are located in stacked relationship, the end edges of the reinforcing cells at the underside of the upper pallet will engage with the lands 5 of the load-carrying platform of the lower pallet in order to prevent slippage between the two pallets. This is illustrated schematically in FIG. 4.

As discussed above, the entire pallet is constructed in one-piece in a single injection moulding operation. In order to form the cellular reinforcing structure at the underside of the load-carrying platforms in the zones of the lateral apertures in the beams 6,8, the mould incorporates retractable cores in these zones. The preferred form of these cores will now be described with reference to FIGS. 5 to 9.

Figure 5:
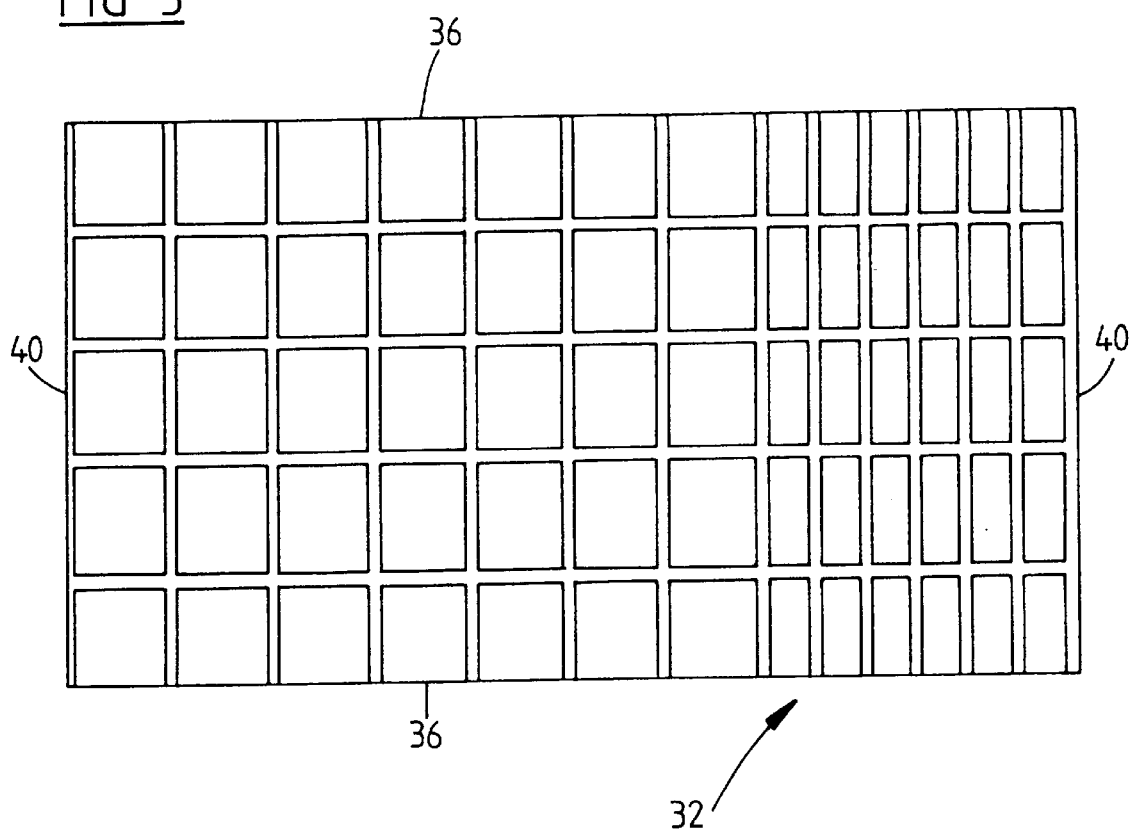
FIG. 5 is a plan view of a retractable mould core for use in the production of the pallet.
Figure 6:
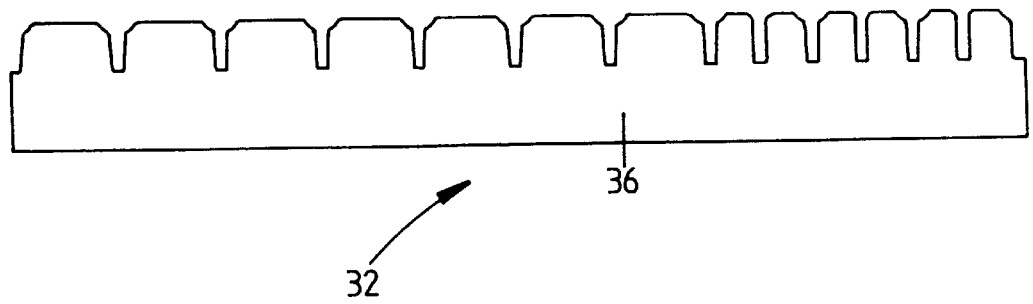
FIG. 6 is a side view of the core.
Figure 7:
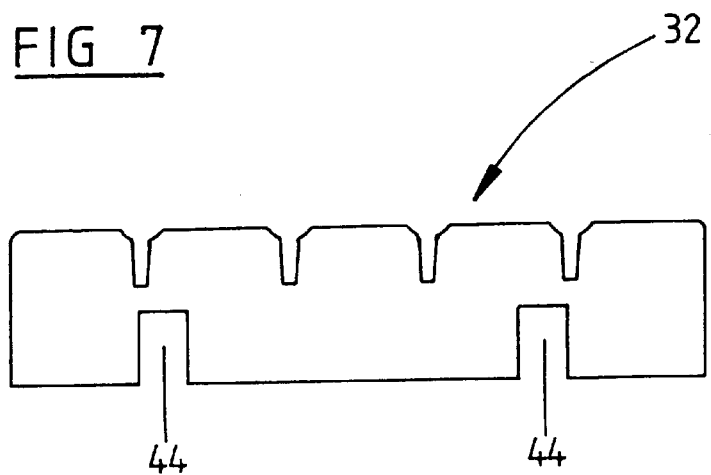
FIG. 7 is an end view of the core.
Figure 8:
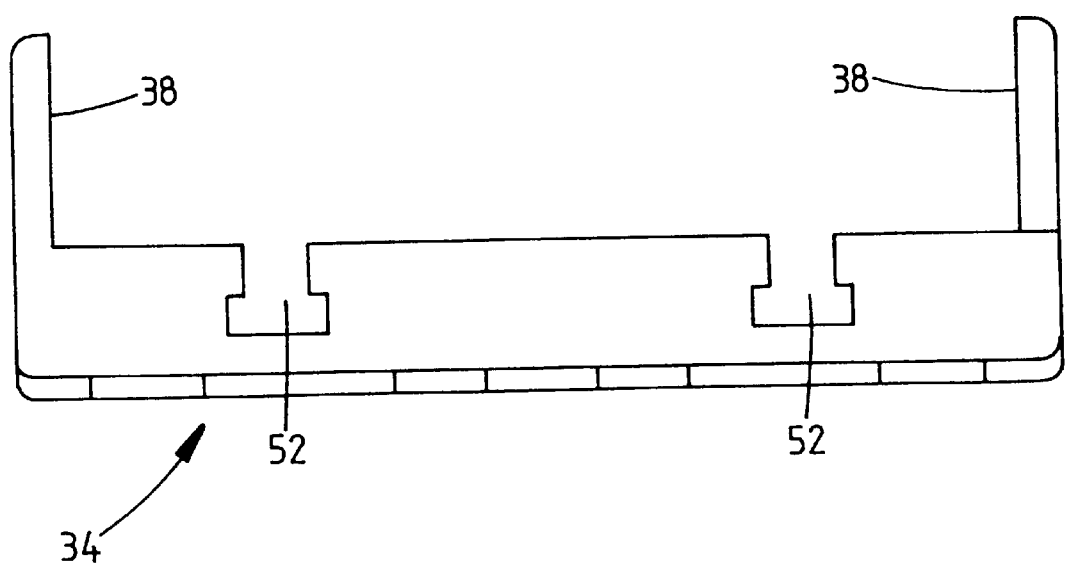
FIG. 8 is an end view of the core guide.

FIGS. 5 to 7 show a core or insert 32 for moulding a cellular structure at the underside of a section of the load-carrying platform 2 of the pallet described above. In the particular form shown, the core 32 produces a structure with rectangular cells, the size of the various cells changing throughout the structure in accordance with the structural requirements of the load-carrying platform. The core 32 is mounted within the mould in a core guide 34 (FIG. 8) of channel-like structure for movement in a direction at right angles to the plane of the load-carrying surface to permit retraction of the core 32 after moulding. The opposed sides 36 of the core 32 are in sliding contact with the sidewalls 38 of the guide 34 and the opposed ends 40 of the core 32 are in sliding contact with the adjacent surface of the mould, a close fit being provided to prevent seepage of incoming plastics material around the sides and ends 36, 40 of the core 32 and into the core guide 34.

Two or more parallel cam strips 42 are attached to the underside of the core 32 and project into the interior of the core guide 34, preferably each strip 42 being located within a respective longitudinal slot 44 at the underside of the core 32. Each cam strip 42 is shaped to provide a plurality of cam tracks 46a, 46b which are inclined to the axis of movement of the core 32. Each of the cam strips 42, which constitutes a driven cam strip, cooperates with a respective driving cam strip 50 which is mounted for sliding movement in a direction at right angles to the axis of movement of the core 32 in a groove 52 provided in the base of the core guide 34. Each driving cam strip 50 has a series of driving cams 54 having driving cam surfaces 54a, 54b which are shaped for cooperation with the respective cam tracks 46a, 46b of the adjacent driven cam strip 42. The driving cam strips 54 are coupled for co-joint movement to a fluid actuated cylinder.

Figure 9:
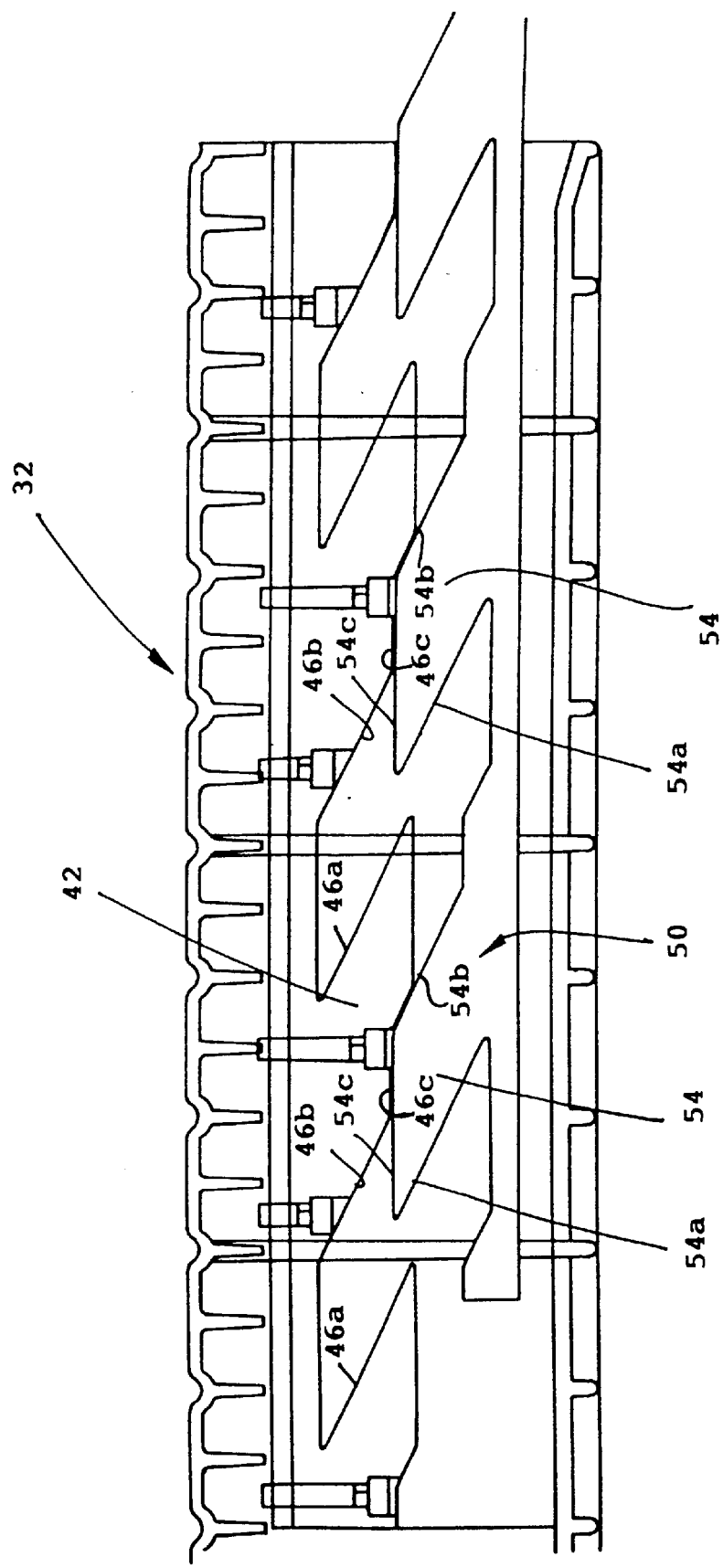
FIG. 9 is a schematic section showing the core and its cooperation with driven and driving cam strips respectively carried by the core and core guide.

FIG. 9 illustrates the position of the driving cam strips 54 in the extended, operative position of the core 32 at which moulding takes place. In this configuration an upper locking surface 54c of each driving cam 54 engages a corresponding surface 46c at the underside of the corresponding cam track, these surfaces extending at right angles to the direction of displacement of the core 32, to lock the core 32 in its operative position.

In order to retract the core 32 after moulding to facilitate ejection of the moulded product, the fluid cylinder is actuated to displace the driving cam strips 50 towards the left as viewed in FIG. 9 whereby the inclined driving cam surfaces 54a of the driving cams 54 engage the correspondingly inclined cam tracks 46a of the driven cam strips 42 and thereby cause the core 32 to be retracted out of engagement with the moulded cellular structure. The inclined cam surfaces and cam tracks enable substantial displacement to be achieved even although the available space for retraction is relatively restricted. To reset the core 32 in preparation for a subsequent moulding, the driving cam strips 50 are displaced in the opposite direction (to the right as shown in FIG. 9) by actuation of the fluid cylinder whereby the inclined driving cam surfaces 54b of the driving cams 54 engage the correspondingly inclined cam tracks 46b of the driven cam strips and cause extension of the core 32 towards its operative position. Towards the end of the displacement of the driving cams 54, the upper locking surfaces 54c of the driving cams 54 move into engagement with the surfaces 46c of the cam tracks to thereby hold the core 32 in its operative positions as previously described.

Although the core structure has been particularly described with reference to the production of reinforcing structure of cell-like form at the under side of the load-carrying platform of the pallet, the core may be configured to provide other reinforcing structure, for example, a series of parallel ribs or webs.

It is to be understood that the core structure described herein is also applicable to the manufacture of articles other than pallets.

The embodiment has been described by way of example and modifications are possible within the scope of the invention.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

What is claimed is:

1. A pallet of unitary construction comprising:
   a load-carrying platform having a first side and a second side;
   said first side comprising a closed surface having a plurality of upstanding projections distributed over the entirety of said surface and lying in substantially the same plane, said projections being separated by a grid-like pattern of longitudinal and transverse lands for preventing slippage of articles carried on said surface;
   said second side comprising an understructure, a plurality of longitudinal beams, and a plurality of lateral connectors, each of said understructure, said longitudinal beams and said lateral connectors comprising a plurality of hollow, open cells, said plurality of cells having at least two different cross-sectional sizes;
   said understructure defining a first plane;
   said plurality of longitudinal beams comprising two outer longitudinal beams and a central longitudinal beam, each said longitudinal beam extending across said second side in a longitudinal direction and defining a second plane, said longitudinal beams operable to engage said lands so as to enable a plurality of said pallets to be stacked one on top of another in an interlocking manner;
   said plurality of lateral connectors extending between said central longitudinal beam and either of said outer longitudinal beams and defining a third plane.

2. A pallet of unitary construction comprising:
   a load-carrying platform having a first side and a second side;
   said first side comprising a closed surface having a plurality of upstanding projections distributed over the entirety of said surface and lying in substantially the same plane;
   said second side comprising an understructure, a plurality of longitudinal beams, and a plurality of lateral connectors;
   said understructure comprising a plurality of hollow, open cells defining a first plane;
   said plurality of longitudinal beams comprising two outer longitudinal beams and a central longitudinal beam, each said longitudinal beam extending across said second side and comprising a plurality of hollow, open cells defining a second plane;
   said plurality of lateral connectors comprising a plurality of hollow, open cells defining a third plane, each said lateral connector extending between said central longitudinal beam and one of said outer longitudinal beams.

3. The pallet of claim 2, wherein said projections are separated by a grid-like pattern of longitudinal and transverse lands for preventing slippage of articles carried on said surface.

4. The pallet of claim 3, wherein said plurality of projections comprise at least one projection having a first area and one projection having a second area.

5. The pallet of claim 3, wherein said longitudinal beams engage said lands so as to enable a plurality of said pallets to be stacked one on top of another in an interlocking manner.

6. The pallet of claim 2, wherein said lateral connectors are offset to receive the tines of a forklift.

7. The pallet of claim 2, wherein said third plane is offset from said first plane so as to form an aperture capable of receiving the tines of a fork-lift.

8. The pallet of claim 2, wherein said lateral connectors are located at a central region and each end region of each said longitudinal beam.

9. A pallet of unitary construction comprising:
   a load-carrying platform having a first side and a second side;
   said first side comprising a closed surface having a plurality of upstanding projections distributed over the entirety of said surface and lying in substantially the same plane;
   said second side comprising an understructure, a plurality of longitudinal beams, and a plurality of lateral connectors;
   said understructure comprising a first plurality of hollow, open cells defining a first plane, said first plurality of cells comprising cells of a first cross-sectional size and cells of a second cross-sectional size;
   said plurality of longitudinal beams comprising a second plurality of cells defining a second plane, said second plurality of cells comprising cells of a third cross-sectional size and cells of a fourth cross-sectional size;
   said plurality of lateral connectors comprising a third plurality of hollow, open cells defining a third plane, said third plurality of cells comprising cells of a fifth cross-sectional size and cells of a sixth cross-sectional size;
   and wherein said third plane lies intermediate said first plane and said second plane.

* * * * *